PROXIMITY SWITCH

Filed March 20, 1968 2 Sheets-Sheet 1

INVENTOR
RICHARD C. BRIDGEMAN
BY [signature]
ATTORNEY

May 26, 1970 R. C. BRIDGEMAN 3,514,627

PROXIMITY SWITCH

Filed March 20, 1968 2 Sheets-Sheet 2

INVENTOR
RICHARD C. BRIDGEMAN
BY Norman A. Ott
ATTORNEY 3,514,627
PROXIMITY SWITCH
Richard C. Bridgeman, Northbrook, Ill., assignor to Vapor Corporation, Chicago, Ill., a corporation of Delaware
Filed Mar. 20, 1968, Ser. No. 714,647
Int. Cl. H01h 35/00
U.S. Cl. 307—116 16 Claims

ABSTRACT OF THE DISCLOSURE

Proximity switch including an inductive sensor and circuitry associated with the sensor comprising an amplifier for amplifying the signal from the sensor, a discriminator receiving the output of the amplifier, a differential amplifier receiving the output of the discriminator, and a switching amplifier receiving the output of the differential amplifier.

This invention relates in general to a proximity switch for use in aircraft, although other uses and purposes may be apparent to one skilled in the art.

The proximity switch of the present invention may be employed in aircraft to indicate the position of a particular movable part such as a cover or door which closes a compartment, or the relative position of a particular structural section of a retractable landing gear. In particular, the proximity switch utilizes magnetic energy in such a way that it is least susceptible to external interferences and causes no undesirable interference itself. In general, the switch includes a sensor that would normally be in a fixed position to coact with an actuating bar on the movable door, cover member or structural member. It also includes the electronic circuitry which responds to the detection signal of the sensor. The switch would only require D.C. power.

The sensor is remotely located from the circuitry, but the detected signal of the sensor may be transmitted through long leads of varying length.

Essentially, the sensor is an inductive device which coacts with a bridge network from which a signal is taken and utilized to determine when the desired mechanical condition has been met. The signal is initially amplified, and then fed into a discriminator. It is here combined with a reference signal from an oscillator. The same oscillator drives the sensor. The voltage outputs of the discriminator are utilized by a differential amplifier which in turn operates a gating circuit which allows oscillator power to be transmitted to a switching circuit when the movable actuation bar has been sensed in a predetermined position by the sensor.

A fail-safe circuit is provided to operate in the event of opening, shorting or grounding of any of the sensor leads.

Accordingly, it is an object of the present invention to provide a new and improved proximity switch that is especially useful for aircraft.

Another object of this invention resides in the provision of a proximity switch that includes a sensor, wherein the switch is immune to non-ferrous metals and resistive changes within the sensor.

A further object of this invention is in the provision of a proximity switch including a sensor and circuitry responsive to the sensor and remotely located from the sensor, which is accurate in operation and not affected by temperature and voltage variations, sensor lead length variations, or electrical interference.

Another object of this invention is to provide a proximity switch that includes a sensor, wherein fail-safe protection is provided for sensor operation.

Still another object of this invention is in the provision of a proximity switch having circuitry capable of reacting to snap action operation or fast and hard on-off conditions of the movable part or structural member.

Other objects, features and advantages of the invention will be apparent from the following detailed disclosures, taken in conjunction with the accompanying sheets of drawings, wherein like reference numerals refer to like parts, in which.

Figure 1:
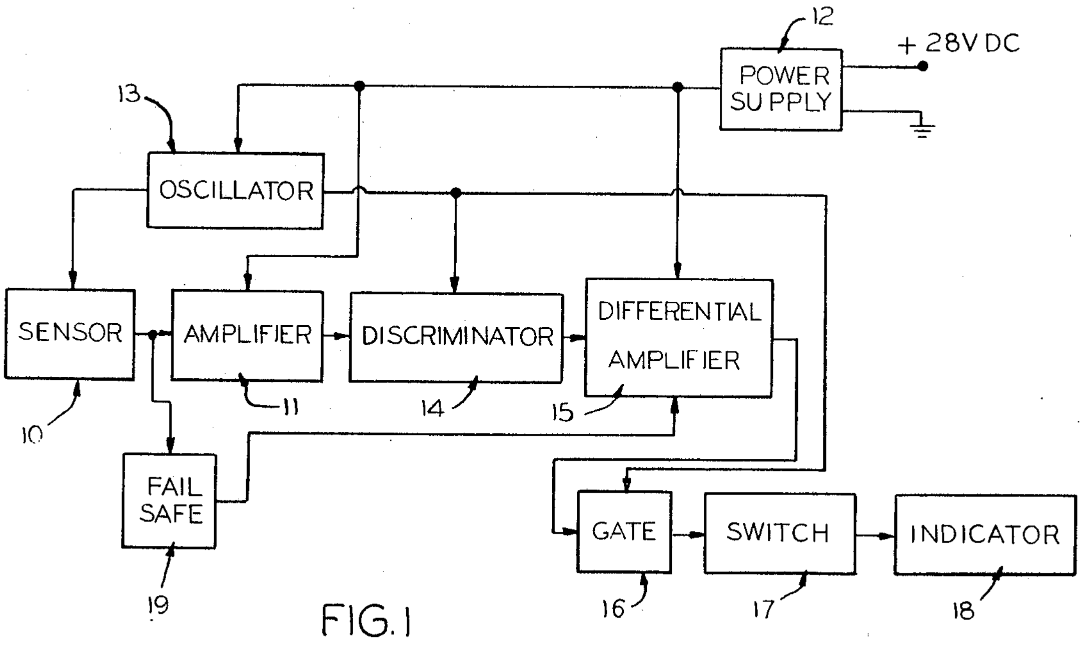
FIG. 1 is a block diagram of the proximity switch according to the present invention.

Referring now to the drawings, and particularly to FIG. 1. A regulated D.C. power supply 12 is connected to an external source of D.C. voltage and furnishes primary power as required by the sensor and the circuitry. In addition to other sections, the power supply powers the oscillator 13. The oscillator 13 drives the sensor 10. The sensor delivers a signal to an A.C. amplifier 11. The A.C. amplifier also receives D.C. power from the power supply 12. The output of the amplifier 11 is received by a discriminator 14 that is also powered by the oscillator 13. A differential amplifier 15 receives the output from the discriminator and conditions it accordingly to operate a gate 16. Operation of the gate 16 connects the oscillator 13 to a switch 17 and drives the switch to a proximity condition (normally open or normally closed depending upon interconnection). An indicator 18 may be operated by the switch 17.

There are two possible modes of operation for the proximity switch of the invention; normally open and normally closed. In the normally open mode of operation, if the input to the differential amplifier 15 is indicative of the air gap relationship between the actuation bar 31 and sensor 10 being greater than the set point, there is no useful output of the differential amplifier. However, if the input to the differential amplifier is indicative of the air gap relationship between the actuation bar and sensor being less than the set point, the differential amplifier will operate the gate 16 and allow oscillator power to be transmitted to the switch 17.

In the normally closed mode of operation, a reversal of these relationships will cause operation of the gate. When the air gap relationship is greater than the set point, the differential amplifier will operate the gate 16 and allow oscillator power to be transmitted to the switch 17. When the air gap relationship is less than the set point, there will be no operation of the gate.

A fail-safe circuit 19 is provided to operate in the event of sensor failure caused by the opening, shorting or grounding of any of the leads between the sensor and the responsive circuitry.

Figure 3:
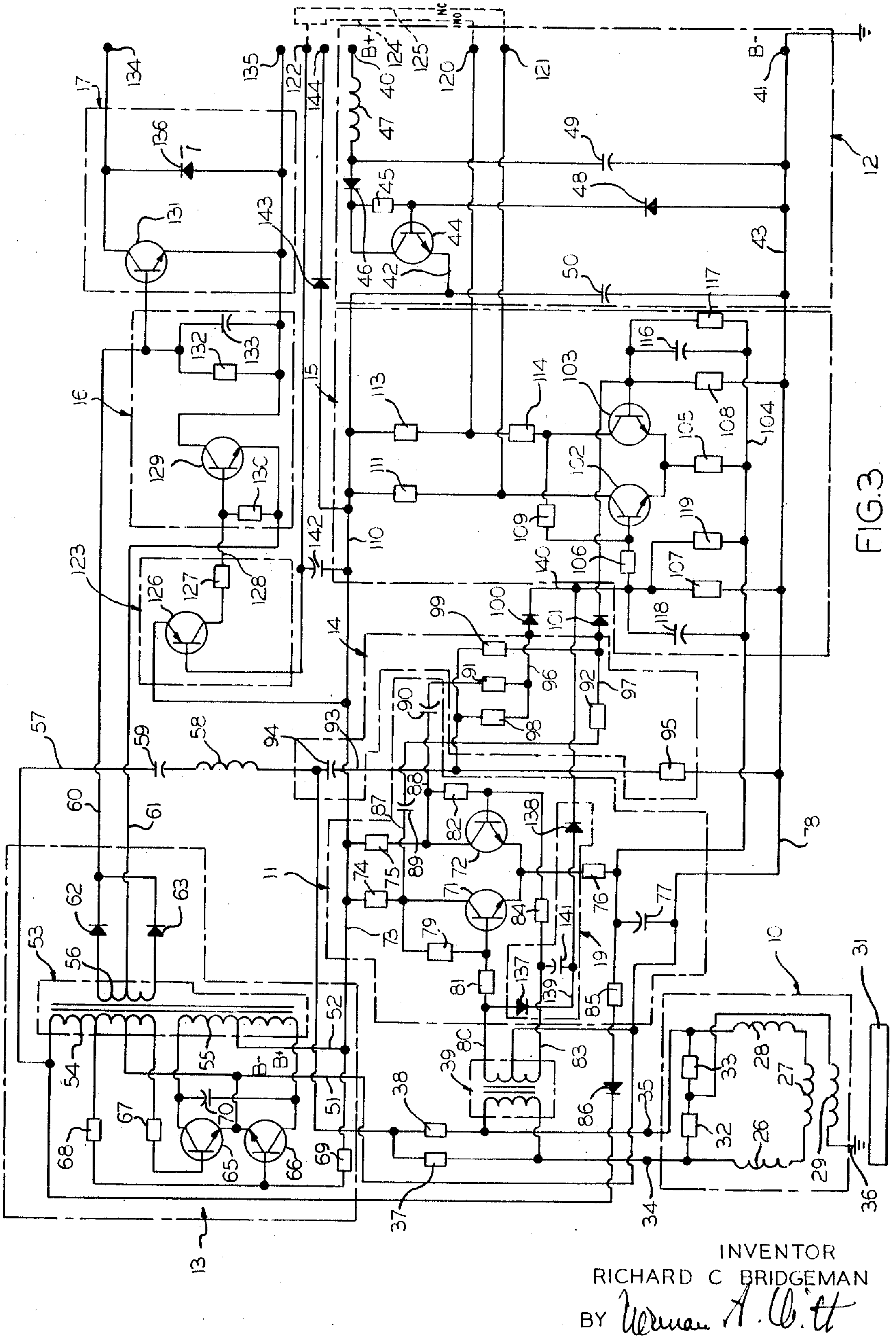
FIG. 3 is an electrical schematic view of the proximity switch of the present invention.

Referring now particularly to FIG. 3, the proximity switch is powered from the output leads 42 and 43 of the regulated D.C. power supply 12 that is connected across the input leads 40 and 41 to a suitable D.C. voltage. No outside A.C. voltage need be supplied. An 18 to 30 volt input from leads 40 and 41 is regulated to 13 volts by this power supply. The supply includes an NPN transistor 44 having its base connected to the positive side of the input through the bias resistor 45. Blocking diode 46 prevents damage from reversed input voltage polarity and block negative input transients. Additional transient filtering is provided by condenser 49 and coil 47. Transistor 44 has a connection to the negative side of the input through Zener diode 48. The collector of transistor 44 is connected to the base through the bias resistor 45 and its emitter is connected to the output lead 42. The output is filtered by condenser 50 which is connected across the output leads 42 and 43. Primary D.C. power for the entire circuitry is provided by the power supply 12. An additional D. C. power source of —6 volts is derived from an output of the oscillator 13 by the rectification action of diode 86 and filtered by resistor 85 and condenser 77.

Power from the power supply 12 is delivered to the oscillator 13 through leads 51 and 52. The oscillator is of the square wave type and includes a transformer 53 having coils 54, 55 and 56. The oscillator also contains NPN transistors 65 and 66. The base of transistor 65 is connected to coil 54 through resistor 67, while the base of transistor 66 is connected to coil 54 through resistor 68. The base of transistor 66 is also connected to bias resistor 69. The collectors of transistors 65 and 66 are connected to coil 55, while the emitters are connected in common and to the coil 54. A condenser 70 is connected across the collectors of the transistors 65 and 66.

The oscillator 13 furnishes a sensor drive output from output lead 57 through a series filter which is comprised of condenser 59 and coil 58. This drive signal is felt at the top of the bridge circuit, this portion of the bridge circuit consisting of matched resistors 37 and 38. The drive signal is transmitted through connecting leads 34 and 35 and is felt at the two matched bridge resistors 32 and 33 in the sensor unit. It is then taken from a common tie point of these two resistors and felt across the drive coil 29.

Another function of the oscillator 13 is to furnish a reference wave from to the discriminator 14. This output is taken from coil 54 of transformer 53 and is conditioned by the series filter comprised of condenser 59 and coil 58. It is shifted in phase by condenser 94 and resistor 95. It is taken from condenser 94 on lead 93 and is felt across resistor 98 and resistor 99 in the discriminator 14. This signal is utilized at the common point of resistor 98 and resistor 91, and at the common point of resistor 92 and 99.

An additional output of the oscillator 13 is utilized in the formation of the —6 volt D.C. This output is taken from coil 54 of transformer 53 of the oscillator 13 and rectified by diode 86. This voltage is then filtered by resistor 85 and condenser 77.

A further function of the oscillator 13 is to furnish the base drive voltage for switch 17. This output is taken from coil 56 of transformer 53 and rectified by diodes 62 and 63. These diodes convert the A.C. generated in coil 56 to a D.C. voltage utilized in driving gate 16.

Figure 2:
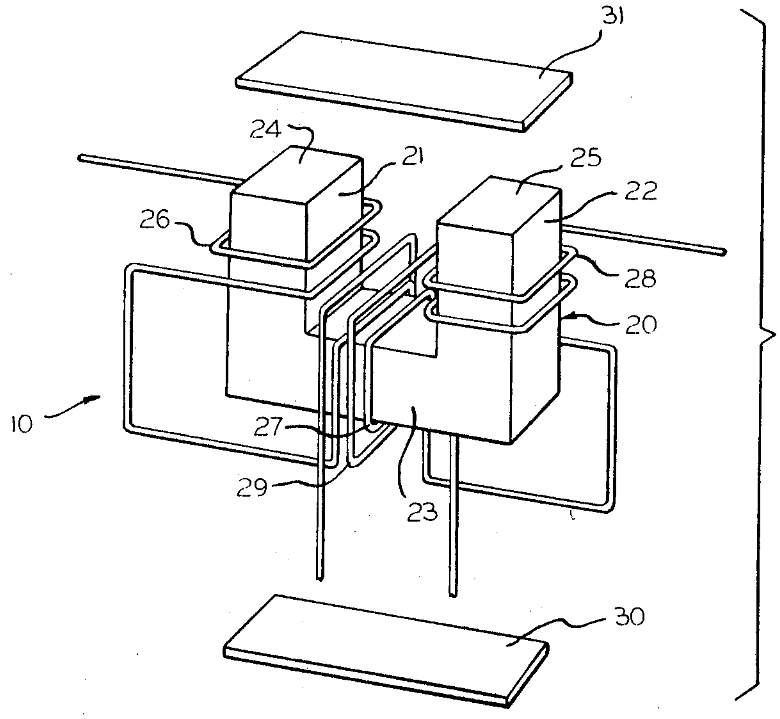
FIG. 2 is a perspective diagrammatic view of the sensor of the proximity switch according to the invention.

The sensor 10 (FIGS. 2 and 3) includes a U-shaped core 20 having parallel legs 21 and 22, and a connecting portion 23. Pole faces 24 and 25 are respectively provided on the free ends of the legs 21 and 22. Coils 26, 27, and 28 are connected in series and respectively mounted on the leg 21, the connecting portion 23 and the leg 22. A drive coil 29 is closely coupled to the coil 27 on the connecting portion 23 so that the coupling coefficient is essentially unity. A permeable adjusting bar 30 is provided to initially adjust the sensor and compensate for manufacturing tolerances.

Essentially, the adjusting bar coacts with the flux energy of the drive coil in initially setting the adjustment of the sensor. The adjusting bar 30 is so set that there is an electrical null at the terminals of series coils 26, 27, and 28 when the actuating bar 31 is positioned in alignment with pole faces 24 and 25 of the core 20; and spaced a predetermined distance therefrom, such as .300 inch.

The sensor 10 would be mounted on a fixed member, and an actuating bar 31 mounted on a movable member such as a cover or door or structural member. This actuation bar would coact with pole faces 24 and 25 to increase the voltage in coils 26 and 28 when positioned at a predetermined gap therefrom and thereby operate the proximity switch.

As seen in FIG. 3, the sensor 10 is connected to the circuitry by three leads; 34, 35 and 36. Within the circuitry, the second pair of matched (equal) resistors 37 and 38 are provided to coact with the matched resistors 32 and 33 in forming a bridge network.

In the sensor, the output voltage of the coil 27 is added to the output voltages of the coils 26 and 28. The magnetic coupling between the coils 26 and 28 is increased when the actuation bar 31 is brought near the sensor pole faces 24 and 25, thereby increasing the voltage output of these coils.

The readout of the sensor is taken from the bridge circuit between the resistors 32 and 37, and the resistors 33 and 38. This output is coupled across transformer 39 to A.C. amplifier 11. The transformer 39 provides for D.C. isolation and furnishes a voltage step up of the sensor signal.

The function of the A.C. amplifier 11 is to further amplify the signal coupled across transformer 39 and to provide two balanced outputs which are out of phase with each other.

The outputs of transformer 39 are taken respectively from lead 80, across resistor 81, to the base of NPN transistor 71; and from lead 83, across resistor 84, to the base of NPN transistor 72. The emitters of transistors 71 and 72 are connected in common and to the —6 volt D.C. power supply comprised of diode 86, resistor 85 and condenser 77 through bias resistor 76. The collector of transistor 71 is connected to its base through feedback resistor 79; to the 13 volt D.C. supply line 73 through load resistor 74; and to decoupling condenser 89. The collector of transistor 72 is connected to its base through feedback resistor 82; to the 13 volt D.C. supply line 73 through load resistor 75 and to the decoupling condenser 90. The decoupling condensers 89 and 90 serve as coupling condensers for the signals developed in the A.C. amplifier, but decouple them from the D.C. voltage level of the collectors of transistors 71 and 72.

The discriminator circuit 14 is used to determine the status of the sensor. It is composed essentially of a resistor network including resistors 91 and 98, and 92 and 99. The reference wave form from oscillator 13 is felt across the remaining two components of the discriminator circuit, condenser 94 and resistor 95. These two components form a phase shift network.

The outputs of the A.C amplifier are felt at the common points of resistors 91 and 98, and 92 and 99 through resistors 91 and 92 respectively. The reference wave form from oscillator 13 is felt at these points through resistors 98 and 99 respectively. The signal levels are summed at these points. These summed signals are taken from the discriminator 14 on leads 96 and 97. Output leads 96 and 97 are connected to the differential amplifier 15.

The discriminator outputs have the following relationships to the state of the sensor. If the air gap between the actuation bar 31 and the sensor pole faces 24 and 25 is greater than the set or null point, the level seen at the common tie point of resistors 91 and 98 will be higher than that seen at the common tie point of resistors 92 and 99. As the actuation bar 31 is moved towards the pole faces 24 and 25, the level at the common tie point of resistors 92 and 99 will tend to increase, and the leval at the common tie point of resistors 91 and 98 will tend to decrease. These relationships may be utilized in the differential amplifier 15 in such a manner that proper outputs will be given to the gate 16, and in turn to switch 17, to allow indications of the status of the sensor to be displayed.

The differential amplifier 15 receives its inputs from leads 96 and 97 of the discriminator 14. The diodes 100 and 101 along with the condensers 118 and 116 demodulate and filter the outputs of the discriminator 14. The differential amplifier 15 is further comprised of NPN transistors 102 and 103 and their associated components. The emitters of transistors 102 and 103 are connected in common and to a bias resistor 105 which connects to the —6 volt D.C. power supply through line 104. The collector of transistor 103 is connected to the base of transistor 102 by a regenerative feedback resistor 109. Resistor 107 and 108 form a part of the filter network associated with condenser 118 and diode 100, and condenser 116 and diode 101. The set point of the proximity switch circuitry is adjusted by selection of resistor 119 which determines the voltage level of filter condenser 118. Resistor 117 is connected in parallel with condenser 116.

The input to transistor 102 is from diode 100, through resistor 106. The input to transistor 103 is from diode 101. These inputs have been rectified by the diodes with the result being that magnitude is now considered and not phase relationship. The differential amplifier compares the relationship of the voltage level at condenser 116 and condenser 118 to determine if the actuating bar 31 is in an energized or deenergized position.

In the normal open mode of operation, the output of the differential amplifier is taken from the point 120. This point is connected to the center of a voltage divider network of resistors 113 and 114. Resistor 113 is connected to the D.C. voltage supply line 42, and resistor 114 is connected to the collector of transistor 103.

In the normally closed mode of operation, the output of the differential amplifier is taken from the point 121, which is connected to a common point of the collector of transistor 102 and a load resistor 111. Resistor 111 is also connected to the D.C. voltage supply line 42.

The output of the differential amplifier 15 is connected to the follower 123 through the point 122. The follower 123 consists of the PNP transistor 126 and load resistor 127. The output from the differential amplifier 15 is further amplified by the follower 123.

The base of the transistor 126 of the follower 123 is connected to point 122. In addition, there is a condenser 142 connected from the base of transistor 126 to the D.C. supply line 42. This condenser is used to delay the conduction of transistor 126 so that it will be insensitive to voltage transients on the D.C. power supply line. The emitter of transistor 126 is connected directly to the D.C. power supply line 42. The collector of transistor 126 is connected to a resistor 127 which is connected to the base of the gate 16 transistor 129 by the output lead 128. A resistor 130 is connected between the emitter and base of transistor 129. The emitter of transistor 129 is also connected to the output lead 61 of the oscillator 13.

In operation, there are two conditions necessary for the actuation of switch 17. The first is the presence of base drive power. This base drive power is taken from oscillator 13, is rectified by diodes 62 and 63 and is filtered by resistor 132 and condenser 133. This filter network is connected to the base of transistor 131 and to the collector of transistor 129. The second condition required for the operation of the switch 17 is the gating of the base drive power by the gate 16. This is accomplished by the conduction of the gate transistor 129, which is controlled by the follower transistor 126, which is in turn responsive to the state of the differential amplifier 15. When the differential amplifier 15 delivers an output at point 120 or 121, this output is connected to point 122 by lead 124 or 125, depending upon normally open or normally closed configuration. The follower transistor 126 triggers the gate transistor 129 to a "hard on" or "hard off" state. The gate 16 transistor 129 controls the operation of the switch transistor 131, which in turn controls the output of the oscillator 13 drive power. A Zener diode 136 is provided across the output of transistor 131 of switch 17 for elimination of transients.

Diode 143 is connected between the D.C. supply line 42 to output point 144. In the normally open configuration the output of the differential amplifier 15 is taken from point 120 and connected to point 122. In the normally closed mode of operation, the output of the differential amplifier 15 is taken from point 121 and connected to point 122. At this time, point 120 is connected to point 144. Diode 143 is incorporated to equalize the load on the differential amplifier between normally open operation and normally closed operation.

Total fail-safe operation is provided by the fail-safe circuit 19. This circuit includes a rectifying diode 137, a condenser 141, and an isolation diode 138. The rectification diode is connected to output line 80 of transformer 39 and rectifies the A.C. signal seen at this point. This potential is felt through connecting lead 139 to the positive side of the condenser 141. The negative side of the condenser 141 is connected to the output lead 83 of the transformer 39 and feels the D.C. reference potential of the A.C. amplifier circuitry. In this condition, the voltage across the condenser will be at a given level. Diode 138 is connected between the condenser 141 and the common point of diode 100 and condenser 118. This diode isolates condenser 141 from the voltage felt at the common point of diode 100 and condenser 118.

In the condition that lead 35 is shorted to lead 36, there will be an indication of no proximity at all times. The same indication of no proximity will occur if there is an opening of the sensor 10 ground lead 36.

If leads 34 or 35 are shorted to ground there will be a signal of extremely high amplitude seen at transformer 39. In this condition, this increase in voltage will be felt at the common tie point of diode 100 and condenser 118. This increase in voltage at this point will so affect the operation of the differential amplifier 15 that no output will be possible. The voltages within the fail-safe circuit are always of such magnitudes that normal operational of the circuit is possible when the leads 34, 35, and 36 are not open, shorted or grounded; but an output of the differential amplifier 15 is not possible when sensor leads 34, 35, or 36 exhibit any open, shorted, or grounded condition or combination thereof.

Accordingly, when the actuation bar 31 approaches the sensor pole faces 24 and 25 and passes the null or set point, the circuitry responds to operate the gate 16 and drive the proximity switching transistor of the switch 17 to the proximity condition (normally open or normally closed depending upon interconnection.)

It will be understood that modifications and variations may be affected without departing from the scope of the novel concepts of the present invention.

The invention is hereby claimed as follows:

1. A sensor for a proximity switch adapted to coact with a magnetic actuation bar, said sensor including a U-shaped core having spaced parallel legs and a connecting portion; first, second and third coils serially connected and one each on the legs and connecting portion, and a drive coil coupled to the coil on the connecting portion, whereby the predetermined presence of the bar to the ends of the core causes an increased voltage output of the coils on the legs.

2. A sensor as defined in claim 1, wherein the coupling coefficient between the drive coil and the coil on the connecting portion is substantially unity.

3. A sensor as defined in claim 1, and a matched pair of resistors one between each of the output ends of the serially connected coils and the drive coil.

4. A sensor as defined in claim 1, and a resistor bridge including upper and lower matched pairs of resistors, and means connecting the output ends of the serially connected coils between the upper and lower resistor pairs.

5. A proximity switch comprising a sensor and a remotely located circuit means responsive to said sensor and connected thereto by a plurality of leads, said circuit means including a first amplifier circuit receiving the signal from the sensor, a discriminator circuit receiving the output of said first amplifier, a differential amplifier circuit receiving the output from the discriminator, a gate circuit receiving the output of the differential amplifier, an oscillator circuit means connecting the oscillator circuit to said sensor, a switch circuit, and said gate circuit responding to said differential amplifier to connect the oscillator circuit to the switch circuit upon said sensor attaining a predetermined condition.

6. A proximity switch as defined in claim 5, and a fail-safe circuit for bypassing the first amplifier in the event of opening, shorting or grounding of any sensor lead.

7. A proximity switch as defined in claim 5, and a D.C. regulated power supply delivering D.C. power to said first amplifier circuit, said discriminator circuit, said differential amplifier circuit, and said oscillator circuit.

8. A proximity switch as defined in claim 6, wherein said fail-safe circuit includes a pair of serially connected diodes between the output of said sensor and the input of said differential amplifier circuit.

9. A proximity switch as defined in claim 5, and means rectifying the output of the discriminator.

10. A proximity switch comprising a sensor and a remotely located circuit means responsive to said sensor and connected thereto by a plurality of leads, said sensor adapted to coact with a magnetic actuation bar and including a U-shaped core having spaced parallel legs and a connecting portion, three coils serially connected and one each on the legs and connecting portion, and a drive coil coupled to the coil on the connecting portion, whereby the predetermined presence of said bar to the ends of the core causes an increased voltage output of the coils on the legs to drive said circuit means to proximity condition.

11. A proximity switch as defined in claim 10, and a resistor bridge network including upper and lower matched pairs of resistors, and means connecting the output ends of the serially connected coils between the upper and lower resistor pairs.

12. A proximity switch as defined in claim 11, and fail-safe means operable upon opening, shorting or grounding of any sensor leads.

13. A proximity switch as defined in claim 11, and said circuit means including a first amplifier circuit receiving the signal from the sensor, a discriminator circuit receiving the output of the first amplifier, a differential amplifier circuit, means rectifying the output from the discriminator and delivering the rectified output to said differential amplifier circuit, a gate circuit receiving the output of the differential amplifier, an oscillator circuit, means connecting the oscillator circuit to said sensor and to said discriminator, a switch circuit, and means operable through said gate circuit in response to said differential amplifier circuit to connect the oscillator circuit to the switch circuit in response to the predetermined presence of said bar.

14. A proximity switch as defined in claim 13, and a fail-safe circuit for bypassing said first amplifier and triggering said differential amplifier upon opening, shorting or grounding of any sensor lead.

15. A proximity switch as defined in claim 13, and an isolation coupling transformer between said resistor bridge network and said first amplifier circuit.

16. A proximity switch as defined in claim 13, wherein said means connecting said oscillator circuit to said sensor includes means for connecting to said drive coil.

References Cited

UNITED STATES PATENTS

| | | |
|---|---|---|
| 2,883,108 | 4/1959 | Thornton. |
| 3,177,481 | 4/1965 | Joy et al. |
| 3,324,647 | 6/1967 | Jedynak. |

ROBERT K. SCHAEFER, Primary Examiner

H. J. HOHAUSER, Assistant Examiner

U.S. Cl. X.R.

340—275, 258